United States Patent

Maugars

[11] Patent Number: 5,923,187
[45] Date of Patent: Jul. 13, 1999

[54] MULTIDIRECTIONAL DATA TRANSMISSION DEVICE

[75] Inventor: Philippe Maugars, Ranes, France

[73] Assignee: U.S. Philips Corporation, New York, N.Y.

[21] Appl. No.: 08/785,457

[22] Filed: Jan. 17, 1997

[30] Foreign Application Priority Data

Jan. 18, 1996 [FR] France .................................. 96 00540

[51] Int. Cl.$^6$ .................... H03K 19/0175; H03K 19/094
[52] U.S. Cl. ................................ 326/86; 326/90; 326/80; 326/81; 326/62
[58] Field of Search .................................. 326/86, 80, 90, 326/62, 81

[56] References Cited

U.S. PATENT DOCUMENTS

| | | | |
|---|---|---|---|
| 4,154,978 | 5/1979 | Tu ............................................. | 326/86 |
| 4,695,740 | 9/1987 | Carter ........................................ | 326/86 |
| 4,713,557 | 12/1987 | Carter ........................................ | 326/86 |
| 5,122,691 | 6/1992 | Balakrishnan ............................. | 326/86 |
| 5,202,593 | 4/1993 | Huang et al. ............................. | 326/86 |
| 5,399,926 | 3/1995 | Adams et al. ............................. | 326/62 |
| 5,736,870 | 4/1998 | Greason et al. ........................... | 326/86 |

*Primary Examiner*—Michael Tokar
*Assistant Examiner*—Richard Roseen

[57] ABSTRACT

The invention offers a data transmission device comprising two lines A and B through which digital data flow whose logic levels are defined for each line A or B by potentials taken off positive supply terminals Va or Vb and negative supply terminals Gnda and Gndb of said line A or B, and an interface module 100 which forms the link between the lines A and B. The interface module 100 comprises two management devices, Ga and Gb, dedicated each to one transmission line A or B. The interface module 100 also comprises two devices called potential monitoring devices, Ca and Cb, each monitoring one transmission line A or B. Each monitoring device Ca or Cb has an input called control input INCA or INCB and comprises means for reproducing on the line it controls, A or B, a data defined by a signal received on said control input INCA or INCB. Each management device Ga or Gb comprises means for permitting it to be disabled by the other management device Gb or Ga. Each management device Ga and Gb further comprises means for detecting on the line it is dedicated to, A or B, the presence of a data to be transmitted to the other line, B or A, respectively. Each management device, Ga or Gb further comprises means for controlling the disabling of the other management device, Gb or Ga, dedicated to the other line, B or A. Each management device Ga or Gb finally comprises defining means for defining for the monitoring device Cb or Ca the data it is to reproduce which has the potential of said other line B or A.

7 Claims, 3 Drawing Sheets

MULTIDIRECTIONAL DATA TRANSMISSION DEVICE

The present invention relates to a data transmission device comprising at least two lines through which digital data flow whose logic levels are defined for each line by potentials taken off positive and negative supply terminals of said line, and an interface module which forms the link between the lines.

Such a device is known from German Patent No. DE 41 13 613 A1. This device, which enables the transmission of digital data from one line to another, requires the electrical characteristics of the two lines to be identical with those of the interface module, more particularly, identical supply voltages. Indeed, the high and low logic levels are to be identical both on the lines and in the interface module, the latter defining on its output the logic level of the transmitted data.

The present invention has for its object to remedy this inconvenience by proposing a transmission device whose interface module systematically adapts the logic level of the transmitted data to the electrical characteristics of the destination line.

Indeed, according to the present invention, a transmission device of the type defined in the opening paragraph is characterized in that:

the interface module comprises at least two management devices dedicated each to one transmission line, and also at least two potential monitoring devices, each controlling one transmission line, each monitoring device has an input called control input and reproducing means for reproducing on the line it controls a data defined by a signal received on said control input, each management device comprises means for permitting the management device to be disabled by another management device, further comprises means for detecting on the line which it is dedicated to the presence of a data to be transmitted to at least another line, further comprises means for controlling the disabling of at least another management device dedicated to another line, and finally comprises defining means for defining to the monitoring device the data it is to reproduce which has the potential of said other line.

This separation of the management and monitoring devices makes it possible to realize in a simple manner in the interface module the systematic adaptation of the logic level of the transmitted data to the electrical characteristics of the destination line.

In a particular embodiment of the invention, a data transmission device as described above is characterized in that each monitoring device comprises a first switch inserted between the line controlled by the monitoring device and the positive supply terminal of said line, and a second switch inserted between the line controlled by the monitoring device and the negative supply terminal of said line, the first switch being controlled by the signal received on the control input of said monitoring device, the second switch being controlled by the reverse of said signal, the two switched having a low internal impedance compared to that of the line controlled by the monitoring device during a period of time in which they switch, and a high internal impedance compared to that of said line during a period of time in which they do not change state.

A variant of this embodiment offers a transmission device characterized in that each management device comprises a D-flip-flop of which a data input is connected to a potential that corresponds to the logic 1 level, and inverting output is connected to a control input of at least a monitoring device that controls another line, which inverting output is intended to apply a disabling signal to at least one management device dedicated to another line, and a reset-to-zero input is connected to the line to which the management device is dedicated, the management device further comprising an inverter, a delay cell and a logic AND gate, the line to which the management device is dedicated being connected to the input of the inverter whose output is connected to the input of the delay cell, the output of which delay cell is connected to an input of the logic AND gate of which at least another input is intended to receive a disabling signal coming from at least one management device dedicated to another line, and the output of which logic AND gate is connected to a clock input of the D-flip-flop.

In another embodiment of the invention, a data transmission device is characterized in that each monitoring device comprises a first switch inserted between the line controlled by the monitoring device and the positive supply terminal of said line, and a second switch inserted between the line controlled by the monitoring device and the negative supply terminal of said line, the two switches having a low internal impedance compared to that of the line controlled by the monitoring device during a period of time in which they switch, and a high internal impedance compared to that of said line during a period of time in which they do not change state, the two switches having control inputs of opposite polarities and being controlled by the signal received on the control input of the monitoring device.

A variant of this embodiment offers a transmission device characterized in that each management device comprises a D-flip-flop of which a data input is connected to a potential that corresponds the logic 1 level, a non-inverting output is connected to a control input of at least a monitoring device that controls another line, an inverting output intended to apply a disabling signal to at least one management device dedicated to another line, and a reset-to-zero input is connected to the line to which the management device is dedicated, the management device further comprising an inverter, a delay cell and a logic AND gate, the line two which the management device is dedicated being connected to the input of the inverter whose output is connected to the input of a delay cell, the output of which delay cell is connected to an input of a logic AND gate of which at least another input is intended to receive a disabling signal coming from at least one management device dedicated to another line, and the output of which logic AND gate is connected to a clock input of the D-flip-flop.

In each of these embodiments, the logic levels of the data transmitted by the interface module systematically correspond to the logic levels defined by the electrical characteristics of the destination lines. However, the embodiments described above require the definition of a logic level that corresponds to the state of rest of the lines, while the significant data to be transmitted correspond, of necessity, to the opposite logic level. The embodiments of the management devices described above thus offer devices that can transmit only logic 0 levels, whereas the logic 1 level corresponds to the state of rest of the lines. In certain cases it may be useful to be able to transmit logic 1 levels without also having to use a different transmission device.

A variant of the invention thus offers a data transmission device characterized in that each management device comprises a T-flip-flop which has an inverting output and a clock input, which output switches at each rising edge of the signal received on the clock input, which inverting output is connected to the control input of at least a monitoring device that controls another line, which inverting output is intended to apply a disabling signal to at least one management device dedicated to another line, which inverting output is initialized at the logic level that corresponds to the state of rest of the lines when the transmission device is put in operation, in that each management device further includes a switch which is opened under the control of at least one disabling signal coming from a management device dedicated to another line, a first terminal of which switch is connected to the line to which the management device is dedicated, and a second terminal of which switch is connected to the input of a delay cell, the output of which delay cell is connected to an input of a logic EXCLUSIVE-OR gate which has two inputs of which the other input is connected to the second terminal of the switch, the output of which logic EXCLUSIVE-OR gate is connected to the clock input of the T-flip-flop.

Another variant of the invention offers a data transmission device characterized in that each management device comprises a T-flip-flop which has a non-inverting output, an inverting output and a clock input, which outputs switch at each rising edge of the signal received on the clock input, which non-inverting output is connected to the control input of at least a monitoring device that controls another line, which inverting output is intended to apply a disabling signal to at least one management device dedicated to another line, which inverting and non-inverting outputs are initialized at the logic level that corresponds to the state of rest of the lines and at the opposite logic level when the transmission device is put in operation, respectively, and in that each management device further includes a switch which is opened under the control of at least one disabling signal coming from a management device dedicated to another line, a first terminal of which switch is connected to the line to which the management device is dedicated, and a second terminal of which switch is connected to the input of a delay cell, the output of which delay cell is connected to an input of a logic EXCLUSIVE-OR gate which has two inputs of which the other input is connected to the second terminal of the switch, the output of which logic EXCLUSIVE-OR gate is connected to the clock input of the T-flip-flop.

These two variants of the invention are capable of transmitting arbitrarily logic 1 or logic 0 levels, while the change from one mode to another is effected by reprogramming the initialization conditions of the T-flip-flops.

These and other aspects of the invention will be apparent from and elucidated with reference to the embodiments described hereinafter.

Figure 1:
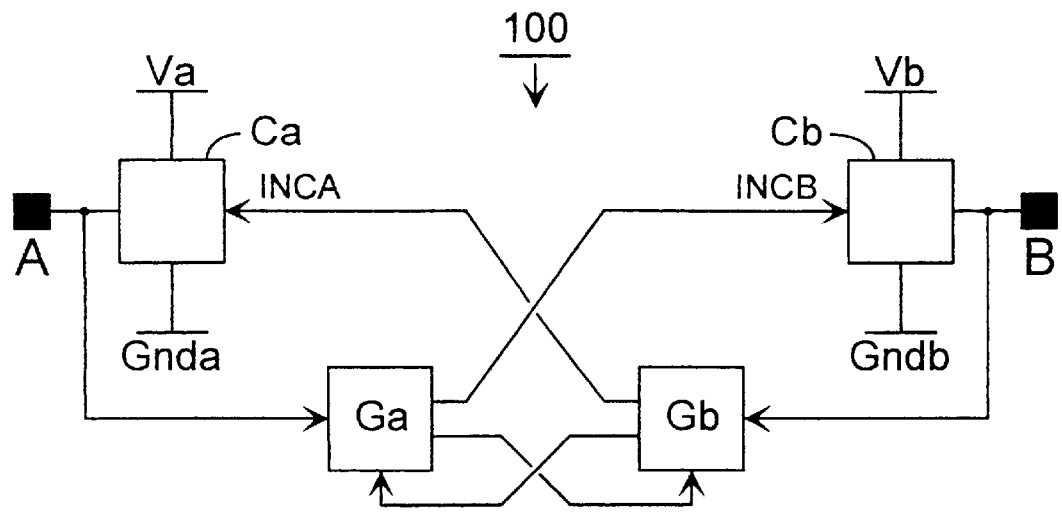
FIG. 1 is a partial functional diagram of a transmission device according to the invention.

FIG. 1 shows a data transmission device comprising two lines A and B by which digital data flow whose logic levels are defined, for each line A and B, by potentials taken off positive supply terminals Va or Vb and negative supply terminals Gnda and Gndb of said line A or B, and an interface module 100 which forms the link between the lines A and B. The interface module 100 comprises two management device, Ga and Gb, dedicated each to one transmission line A or B. The interface module 100 also comprises two potential monitoring devices, Ca and Cb, each controlling one transmission line A or B. Each monitoring device Ca and Cb has an input called control input INCA and INCB and means for reproducing on the line it controls, A or B, a data defined by a signal received on said control input INCA or INCB. Each management device Ga or Gb comprises means for permitting it to be disabled by the other management device Gb or Ga. Each management device, Ga or Gb, further includes means for detecting the presence on the line it is dedicated to, A or B, of a data to be transmitted to the other line, B or A respectively. Each management device Ga or Gb further includes means for controlling the disabling of the other management device, Gb or Ga, dedicated to the other line, B or A. Each management device Ga or Gb finally comprises defining means for defining to the monitoring device Cb or Ca the data it is to reproduce which has the potential of said other line B or A.

Figure 2:
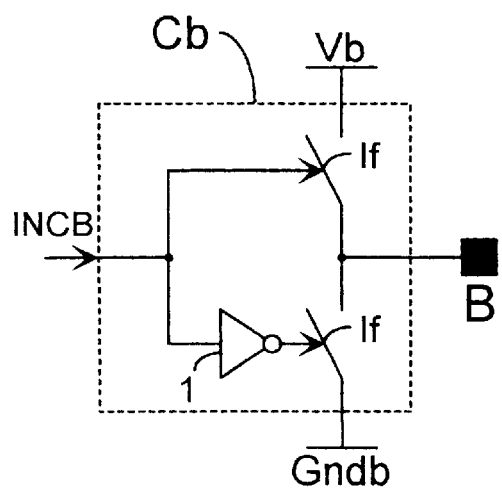
FIG. 2 is a partial functional diagram of a monitoring device included in a particular embodiment of the invention.

FIG. 2 shows a monitoring device Cb included in a particular embodiment of the invention. It comprises a first switch If, inserted between the line B controlled by the monitoring device and the positive supply terminal Vb of said line B, and a second switch If inserted between the line B and the negative supply terminal Gndb of said line, the first switch If being controlled by the signal received on the control input INCB of the monitoring device Cb. The second switch If being controlled by the reverse of said signal INCB, which reverse signal is obtained by means of the inverter i. The two switch If have a low internal impedance compared to that of the line B during a period of time in which they switch, and a high internal impedance compared to that of said line B during a period of time in which they do not change state. The two switches If may be realized on the basis of transistors which have the same polarity, for example, bipolar NPN transistors. If the signal received on the control input INCB has the logic 1 level, the potential of the line B will be imposed at Vb, and thus at the high logic level featured by line B. If the signal received on the control input INCB has the logic 0 level, the potential of the line B will be imposed at Gndb, and thus at the low logic level featured by line B.

Figure 3:
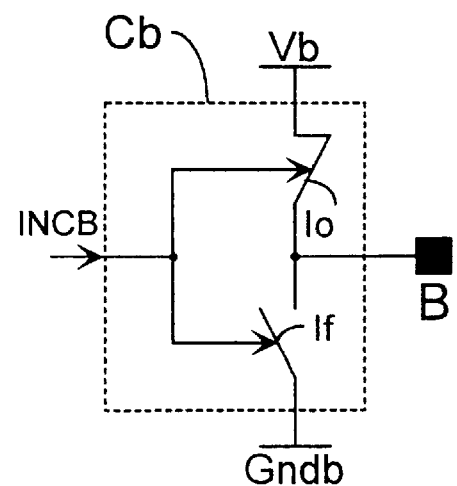
FIG. 3 is a partial functional diagram of a monitoring device included in another particular embodiment of the invention.

FIG. 3 shows a monitoring device Cb included in a particular embodiment of the invention. It comprises a first switch Io inserted between the line B controlled by the monitoring device Cb and the positive supply terminal Vb of said line B, and a second switch If inserted between the line B and the negative supply terminal Gndb of said line B. The two switches Io and If have a low internal impedance compared to that of line B during the period of time in which they switch and a high internal impedance compared to that of said line B during a period of time in which they do not change state. The switches Io of If have control inputs of opposite polarities and may be realized on the basis of, for example, a PMOS transistor and an NMOS transistor, respectively. They are controlled by the signal INCB received on the control input of the monitoring device. If the signal received on the control input INCB has a logic 0 level, the potential of line B will be imposed at Vb and thus at the high logic level featured by line B. If the signal received on the control input INCB has a logic 1 level, the potential of the line B will be imposed a Gndb and thus at the low logic level featured by line B.

Figure 4:
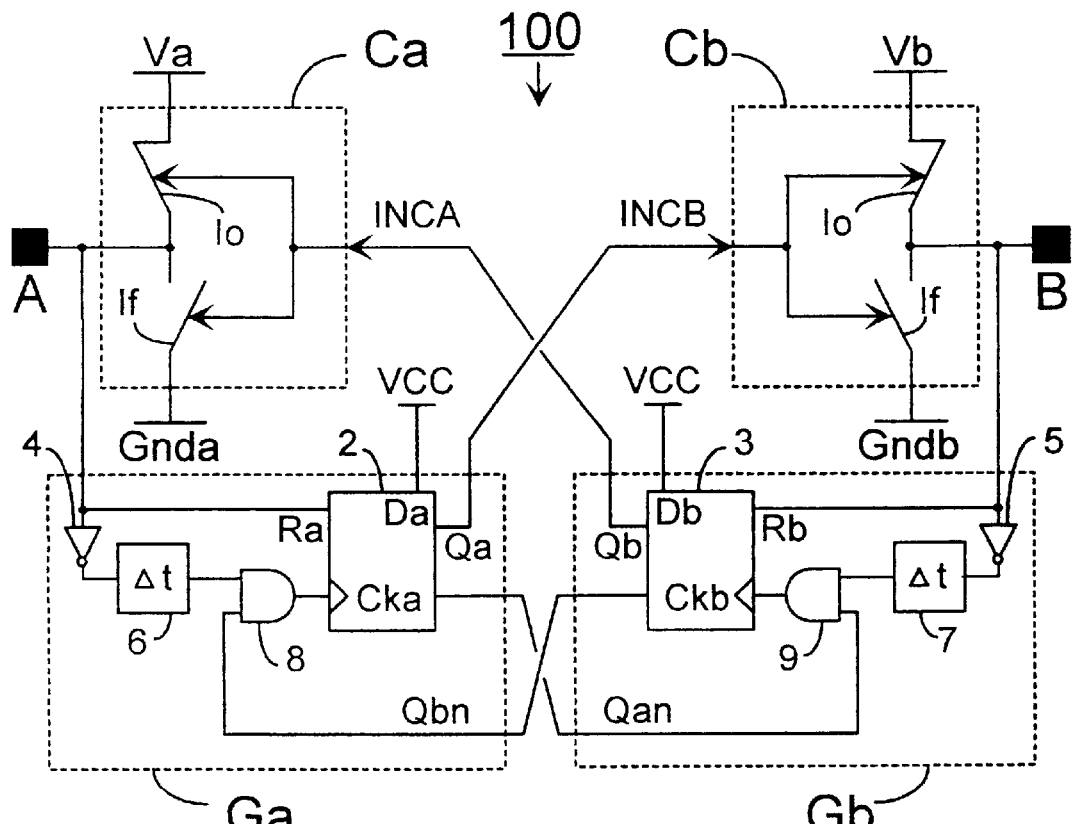
FIG. 4 is a partial functional diagram of a transmission device according to an embodiment of the invention.

FIG. 4 shows a transmission device according to an embodiment of the invention, in which each monitoring device Ca or Cb comprises a first switch Io inserted between the line A or B controlled by the monitoring device and the positive supply terminal Va or Vb of said line A or B, and a switch If inserted between the line A or B and the negative supply terminal Gnda or Gndb of said line. The switches Io and If have a low internal impedance compared to that of the line A or B during a period of time in which they switch, and a high internal impedance compared to that of said line during a period of time in which they do not change state. The two switches Io and If have control inputs of opposite polarities. They are controlled by the signal INCA and INCB received on the control input of the monitoring device Ca or Cb. In this embodiment of the invention, each management device Ga or Gb comprises a D-flip-flop, 2 or 3, of which a data input, Da or Db, is connected to a potential VCC that corresponds to the logic 1 level in the interface module 100, a non-inverting output Qa or Qb of which D-flip-flop 2 or 3 is connected to the control input INCB or INCA of the monitoring device, Cb or Ca, controlling the other line B or A, an inverting output Qan or Qbn of which D-flip-flop 2 or 3 applies a disabling signal to at least one management device Gb or Ga dedicated to another line B or A, and a reset-to-zero input Ra or Rb of which D-flip-flop 2 or 3 is connected to the line A or B to which the management device Ga or Gb is dedicated. The management device Ga or Gb further comprises an inverter 4 or 5 respectively, a delay cell 6 or 7 respectively, and a logic AND gate 8 or 9 respectively, the line A or B to which the management device Ga or Gb is dedicated being connected to the input of the inverter 4 or 5, the output of which inverter is connected to the input of the delay cell 6 or 7, the output of which delay cell is connected to an input of the logic AND gate 8 and 9 whose other input receives the disabling signal Qbn or Qan coming from the management device Gb or Ga dedicated to the other line B or A, and the output of which logic AND gate 8 or 9 is connected to a clock input Cka or Ckb of the D-flip-flop 2 or 3.

Figure 5:
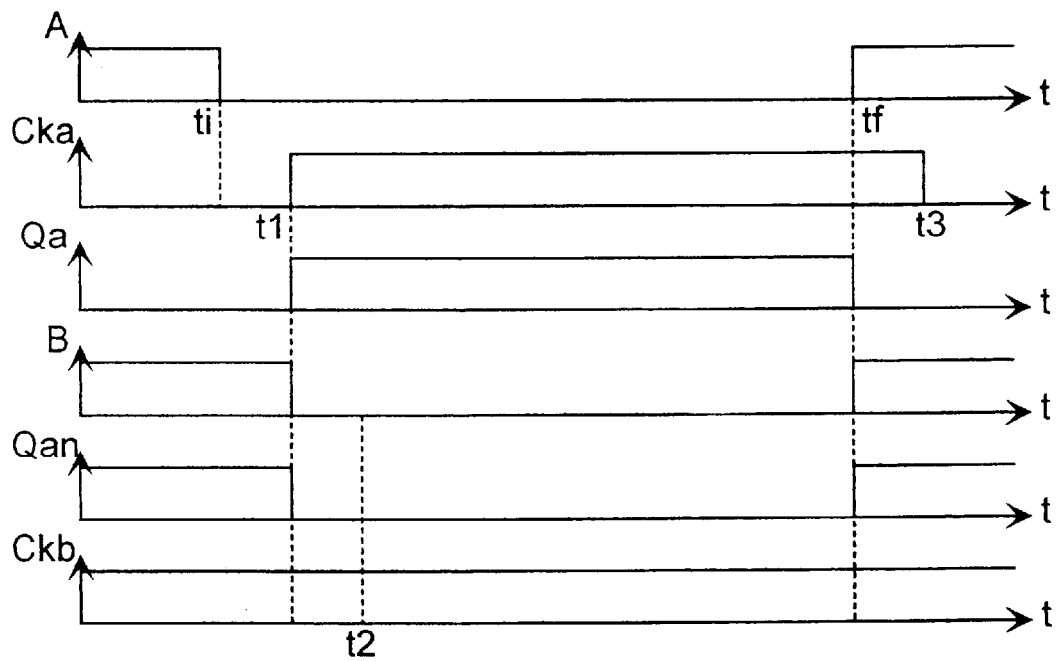
FIG. 5 is a set of timing diagrams representing the evolution with time of signals present in a transmission device according to this embodiment of the invention.

FIG. 5 shows the evolution with time of signals which occur in a transmission device according to this embodiment of the invention: in a state of rest, the two lines A and B have the logic 1 level. The reset-to-zero inputs Ra and Rb of the D-flip-flops 2 and 3 thus have the logic 1 level, in consequence, the non-inverting outputs Qa and Qb of the D-flip-flops 2 and 3 have the logic 0 level and the inverting outputs Qan and Qbn have the logic 1 level. The lines A and B may change to the logic 0 level, while the switches Io have a low internal impedance compared to that of the lines during the period of time in which the switches do not change state, If, for example, this switching is effected on the line A at instant ti, at instant t1, so that t1−ti=Δt, the output of delay cell 6 restores the output of the inverter 4 which has inverted the logic 0 level present on A. Cka thus changes to the logic 1 level while the rising edge causes a logic 1 level to be stored in the D-flip-flop 2. The output Qan changes to 0, thus imposing a logic 0 level on an input of the AND gate 9, and thus also on the clock input Ckb of the D-flip-flop 3, which ensures the disabling of the management device Gb. Simultaneously, the output Qa changes to 1 and controls the switching of the switches Io and If. The internal impedance of the latter two being low compared to that of line B, If imposes on line B the potential Gndb which corresponds to the logic 0 level. The influence of this switching on the input of the AND gate 9 will only be felt at instant t2, because the signal passes through the delay cell 7, that is to say, at the end of a period Δt after the flip-flop 3 has been disabled. The change of line B to the 0 level is thus disregarded. At instant tf, the line A comes back to the 1 level, thus transmitting a logic 1 level to the reset-to-zero input Ra of the D-flip-flop 2. Since this input operates in the asynchronous mode, the output Qa changes to the logic 0 level, thus causing switches Io and If of the monitoring device Cb to be switched. These switches having a low internal impedance compared to that of line B controlled by the monitoring device Cb during the period of time in which they switch, Io imposes the logic 1 level on line B. Simultaneously, the output Qan again changes to the logic 1 level, thus imposing a logic 1 level on an input of the AND gate 9, which ensures the re-enabling of the management device Gb. At instant t3, the clock signal Cka of the D-flip-flop 2 finally switches because of the delay cell 6, without having any effect on the state of the D-flip-flop. The state of rest is then reached again. The device being perfectly symmetrical, the description made above can easily be adapted to the case where it is B and not A that features the data to be transmitted.

Figure 6:
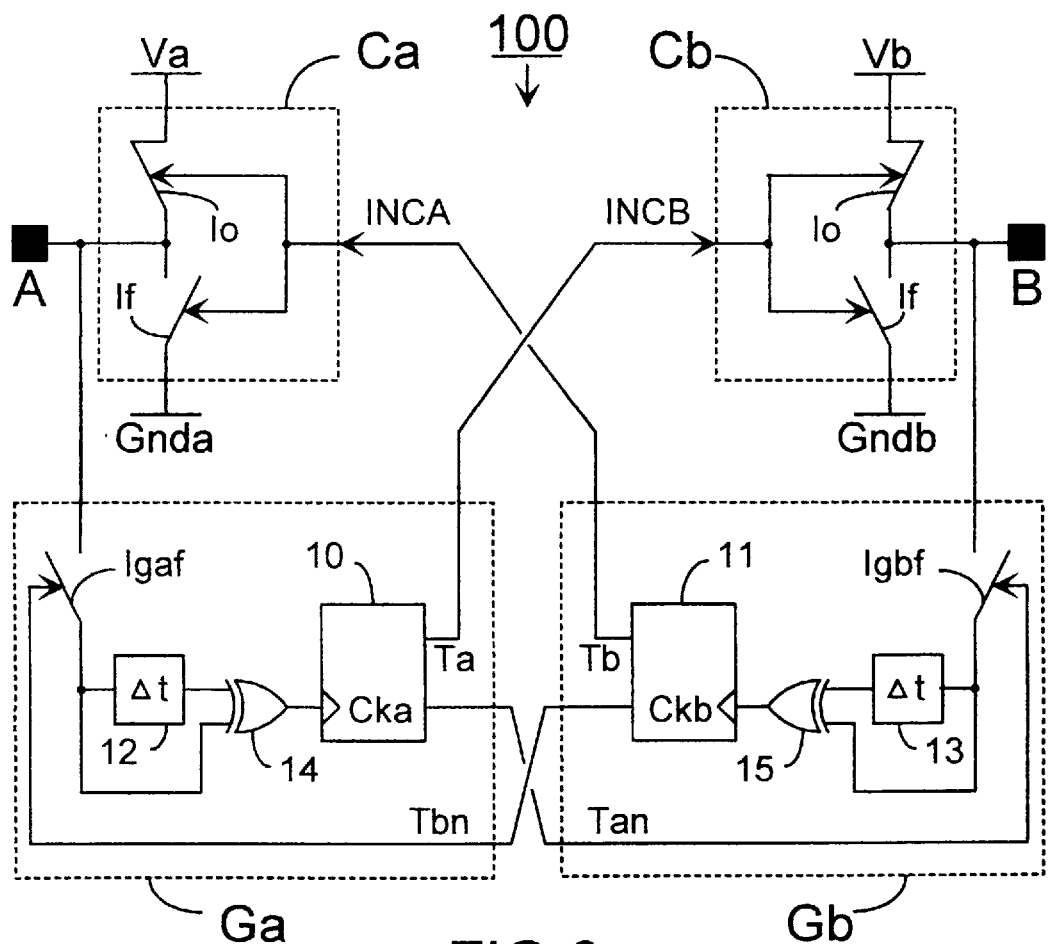
FIG. 6 is a partial functional diagram of a transmission device according to an embodiment of a variant of the invention.

FIG. 6 shows a transmission device according to a variant of the invention, in which each monitoring device Ca or Cb comprises a first switch Io inserted between the line A or B controlled by the monitoring device and the positive supply terminal Va or Vb of said line A or B, and a switch If inserted between the line A or B and the negative supply terminal Gnda or Gndb of said line. The switches Io and If have a low internal impedance compared to that of the line A or B during a period of time in which they switch and a high internal impedance compared to that of said line during the period of time in which they do not change state. The two switches Io and If have control inputs of opposite polarities. They are controlled by the signal INCA or INCB received on the control input of the monitoring device Ca or Cb. In this embodiment of a variant of the invention, each management device Ga or Gb comprises a T-flip-flop 10 or 11 which has a non-inverting output Ta or Tb, an inverting output Tan or Tbn and a clock input Cka or Ckb, said outputs switching with each rising edge of the signal received on the clock input Cka or Ckb, the non-inverting output Ta or Tb of which T-flip-flop 10 or 11 is connected to the control input INCA or INCB of the monitoring device Cb or Ca which controls the other line B or A, the inverting output Tan or Tbn of which T-flip-flop 10 or 11 applies a disabling signal to the other management device Gb or Ga dedicated to the other line B or A, the inverting output Tan or Tbn and non-inverting output Ta or Tb of which T-flip-flop 10 or 11 are initialized at the respective logic level that corresponds to the state of rest of line A or B and at the opposite logic level when the transmission device is put in operation. The management device Ga or Gb further includes a switch Igaf or Igbf which is opened under the control of the disabling signal Tbn or Tan coming from the management device Gb or Ga dedicated to the other line B or A, a first terminal of which switch Igaf or Igbf is connected to the line A or B to which the management device Ga or Gb is dedicated, and a second terminal of which switch Igaf or Igbf is connected to the input of a delay cell 12 or 13, the output of which delay cell is connected to an input of a logic EXCLUSIVE-OR gate which has two inputs 14 and 15, of which the other input is connected to the second terminal of the switch Igaf or Igbf, the output of which logic EXCLUSIVE-OR gate 14 or 15 is connected to the clock input Cka or Ckb of the T-flip-flop 10 or 11.

Figure 7:
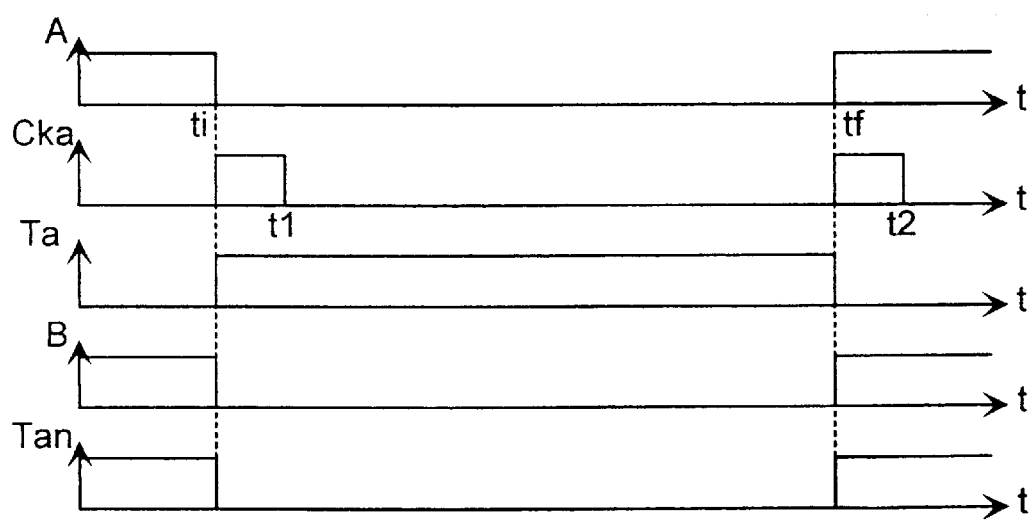
FIG. 7 is a set of timing diagrams representing the evolution with time of signals present in this embodiment of a variant of the invention.

FIG. 7 represents the evolution with time of signals present in a transmission device according to this variant of the invention: in a state of rest, the two lines A and B have the logic 1 level. After the initialization, the non-inverting outputs Ta and Tb of the T-flip-flops 10 and 11 have the logic 0 level and the inverting outputs Tan and Tbn have the logic 1 level. The switches Igaf and Igbf are thus closed. The lines A and B may change to the logic 0 level, the switch Io and If having a low internal impedance compared to that of the lines when these switches do not change state, If, for example, this switching takes place on the line A at instant ti, until instant t1, defined by: t1−ti=Δt, the output of the delay cell restores the logic 1 level which was initially present on A. Cka thus changes to the logic 1 level at instant ti, this rising edge causing the outputs of the T-flip-flop 10 to be switched. The output Tan changes to 0, thus causing the switch Igbf to be opened, which ensures the disabling of the management device Gb. Simultaneously, the output Ta changes to 1 and controls the switching of the switches Io and If. The internal impedance of the latter being low compared to that of line B, If imposes on line B the potential Gndb which corresponds to the logic 0 level. At the instant tf, the line A regains the 1 level. Until instant t2 defined by: t2−tf=Δt, the output of the delay cell 12 restores the logic 0 level previously present on A. Cka thus changes to the logic 1 level at instant tf, this rising edge causing the outputs of the T-flip-flop 10 to switch. The output Tan changes to 1, thus causing the switch Igbf to be closed, which ensures that the management device Gb is re-enabled. The output Tan changes to 1 thus causing the switch Igbf to close, which ensures that the management device Gb is re-enabled. Simultaneously, the output Ta changes to 0 and controls the switching of the switches Io and If. The latter two having a low internal impedance compared to that of the line B controlled by the monitoring device Cb during the period in which they switch. Io imposes the logic 1 level on line B. At instant t3, because of the delay cell 6, the clock signal Cka of the D-flip-flop 2 finally switches without having any effect on the state of the D-flip-flop 2. The state of rest is thus reached again. As the device is perfectly symmetrical, the description made above may easily be adapted to the case where it is B and not A that features the data to be transmitted.

I claim:

1. A data transmission device comprising:
    an interface module which is coupled between at least two transmission lines for carrying digital data flows, respectively,
    in which data transmission device the interface module comprises:
        potential monitoring devices each controlling a different one of the at least two transmission lines, each potential monitoring device comprising and reproducing means for reproducing data on the transmission line controlled by the potential monitoring device, and a control input to control the monitoring device, which control input receives the data from another one of the transmission lines, logic levels of the data for each of the potential monitoring devices being defined by potentials taken off positive and negative supply terminals dedicated to the transmission line controlled by the potential monitoring device so as to adapt the data to electrical characteristics of the transmission line, the potentials dedicated to the transmission line being different from the potentials dedicated to the other transmission line, and
        management devices dedicated each to a different one of the at least two transmission lines, each management device comprising means for permitting the management device to be disabled by another management device, means for detecting on the transmission line dedicated to the management device of a signal to be transmitted to at least one other transmission line, means for transmitting the detected signal to the control input of at least one potential monitoring device controlling the other transmission line so as to generate the data on the other transmission line controlled by the potential monitoring device, and means for controlling disabling of at least one other management device upon detection of the signal.

2. The data transmission device as claimed in claim 1, characterized in that each monitoring device comprises a first switch inserted between the line controlled by the monitoring device and the positive supply terminal of said line, and a second switch inserted between the line controlled by the monitoring device and the negative supply terminal of said line, the first switch being controlled by the signal received on the control input of said monitoring device, the second switch being controlled by the reverse of said signal, the two switches having a low internal impedance compared to that of the line controlled by the monitoring device during a period of time in which they switch, and a high internal impedance compared to that of said line during a period of time in which they do not change state.

3. The data transmission device as claimed in claim 1, characterized in that each monitoring device comprises a first switch inserted between the line controlled by the monitoring device and the positive supply terminal of said line, and a second switch inserted between the line controlled by the monitoring device and the negative supply terminal of said line, the first switch being controlled by the signal received on the control input of said monitoring device, the second switch being controlled by the reverse of said signal, the two switches having a low internal impedance compared to that of the line controlled by the monitoring device during a period of time in which they switch, and a high internal impedance compared to that of said line during a period of time in which they do not change state, the two switches having control inputs of opposite polarities and being controlled by the signal received on the control input of the monitoring device.

4. The data transmission device as claimed in claim 1, characterized in that each management device comprises a D-flip-flop of which a data input is connected to a potential that corresponds to the logic 1 level, an inverting output is connected to a control input of at least a monitoring device that controls another line, which inverting output is intended to apply a disabling signal to at least one management device dedicated to another line, and a reset-to-zero input is connected to the line to which the management device is dedicated, the management device further comprising an inverter, a delay cell and a logic AND gate, the line to which the management device is dedicated being connected to the input of the inverter whose output is connected to the input of the delay cell, the output of which delay cell is connected to an input of the logic AND gate of which at least another input is intended to receive a disabling signal coming from at least one management device dedicated to another line, and the output of which logic AND gate is connected to a clock input of the D-flip-flop.

5. A data transmission device as claimed in claim 1, characterized in that each management device comprises a D-flip-flop of which a data input is connected to a potential that corresponds to the logic 1 level, a non-inverting output is connected to the control input of at least a monitoring device that controls another line, an inverting output intended to apply a disabling signal to at least one management device dedicated to another line, and a reset-to-zero input is connected to the line to which the management device is dedicated, the management device further comprising an inverter, a delay cell and a logic AND gate, the line to which the management device is dedicated being connected to the input of the inverter whose output is connected to the input of a delay cell, the output of which delay cell is connected to an input of a logic AND gate of which at lest another input is intended to receive a disabling signal coming from at least one management device dedicated to another line, and the output of which logic AND gate is connected to a clock input of the D-flip-flop.

6. The data transmission device as claimed in claim 1, characterized in that each management device comprises a T-flip-flop which has an inverting output and a clock input, which output switches at each rising edge of the signal received on the clock input, which inverting output is connected to the control input of at least a monitoring device that controls another line, which inverting output is intended to apply a disabling signal to at least one management device dedicated to another line, which inverting output is initialized at the logic level that corresponds to the state of rest of the lines when the transmission device is put in operation, in that each management device further includes a switch which is opened under the control of at least one disabling signal coming from a management device dedicated to another line, a first terminal of which switch is connected to the line to which the management device is dedicated, and a second terminal of which switch is connected to the input of a delay cell, the output of which delay cell is connected to an input of a logic EXCLUSIVE-OR gate which has two inputs of which the other input is connected to the second terminal of the switch, the output of which logic EXCLUSIVE-OR gate is connected to the clock of the T-flip-flop.

7. The data transmission device as claimed in claim 1, characterized in that each management device comprises a T-flip-flop which has a non-inverting output, an inverting output and a clock input, which outputs switch at each rising edge of the signal received on the clock input, which non-inverting output is connected to the control input of at least a monitoring device that controls another line, which inverting output is intended to apply a disabling signal to at least one management device dedicated to another line, which inverting and non-inverting outputs are initialized at the logic level that corresponds to the state of rest of the lines and at the opposite logic level when the transmission device is put in operation, respectively, and in that each management device further includes a switch which is opened under the control of at least one disabling signal coming from a management device dedicated to another line, a first terminal of which switch is connected to the line to which the management device is dedicated, and a second terminal of which switch is connected to the input of a delay cell, the output of which delay cell is connected to an input of a logic EXCLUSIVE-OR gate which has two inputs of which the other input is connected to the second terminal of the switch, the output of which logic EXCLUSIVE-OR gate is connected to the clock input of the T-flip-flop.

* * * * *